United States Patent [19]

Passerell

[11] Patent Number: 4,628,965
[45] Date of Patent: Dec. 16, 1986

[54] STAB-TYPE COUPLING

[75] Inventor: David P. Passerell, Geneva, Ohio

[73] Assignee: Perfection Corporation, Madison, Ohio

[21] Appl. No.: 614,319

[22] Filed: May 25, 1984

Related U.S. Application Data

[63] Continuation of Ser. No. 518,391, Jul. 29, 1983, abandoned, which is a continuation of Ser. No. 251,776, Apr. 7, 1981, abandoned.

[51] Int. Cl.$^4$ .............................................. F16L 47/00
[52] U.S. Cl. .......................................... 138/89; 285/4; 285/105
[58] Field of Search ...................... 138/89, 96 R, 96 T, 138/109; 285/3, 4, 105, DIG. 2, DIG. 7; 403/2; 141/350; 220/277; 215/249, 253

[56] References Cited

U.S. PATENT DOCUMENTS

| | | | |
|---|---|---|---|
| 986,905 | 3/1911 | Carlson | 285/4 |
| 1,891,826 | 12/1932 | McGinnis | 220/277 X |
| 2,082,144 | 6/1937 | Bowers | 138/96 |
| 3,794,098 | 2/1974 | Versen | 152/428 |
| 3,913,207 | 10/1975 | Frey | 29/413 |
| 4,022,205 | 5/1977 | Tenczar | 128/214 |
| 4,205,707 | 6/1980 | Lundgren | 138/89 |
| 4,229,025 | 10/1980 | Volgstadt et al. | 285/105 |
| 4,269,232 | 5/1981 | Witschi | 138/96 |
| 4,335,756 | 6/1982 | Sharp et al. | 138/89 |

FOREIGN PATENT DOCUMENTS 54-47121 4/1979 Japan .

Primary Examiner—Stephen Marcus
Assistant Examiner—Mark Thronson
Attorney, Agent, or Firm—Fay, Sharpe, Fagan, Minnich & McKee

[57] ABSTRACT

An improved stab-type coupling of the type used for connecting an end portion of a smooth wall non-metallic pipe or tube to fittings or other pipes or tubes wherein the coupling body has a first end area including an internal recess adapted to receive the end portion of a smooth walled non-metallic pipe. An elongated hollow insert is disposed within the recess for receiving the pipe end portion axially thereover. At least a pipe gripping member is disposed within the recess in a radially spaced surrounding relationship with a portion of the insert to retainingly engage the pipe end portion as it is inserted axially therepast. The improvement comprises a closing structure associated with the body first end area for closing the recess and thereby protect the coupling interior. The closing structure accommodates selective removal of a portion thereof from the body to expose the recess prior to receipt of a pipe end portion thereinto. The accommodating portion may comprise any convenient arrangement such as a frangible zone, a designated cutting area and the like. The closing structure may be comprised of a separate, removable end cap.

2 Claims, 6 Drawing Figures

STAB-TYPE COUPLING

This application is a continuation of application Ser. No. 518,391, filed July 29, 1983, now abandoned, which is a continuation of application Ser. No. 251,776, filed Apr. 7, 1981, now abandoned.

BACKGROUND OF THE INVENTION

This invention relates to an improvement for stab-type couplings or couplings in which assembly of a smooth wall tube to a coupling body is accomplished by pushing or thrusting the tube into the coupling body. Gripping of the tube surface and resistance to attempted withdrawal is based on the "Chinese finger" principle. Retaining or gripping means cooperates with the tube such that the greater the pull out force, the more securely the tube becomes seated within the coupling. The subject invention provides an improvement for the general type of coupling structure disclosed in the commonly assigned U.S. patent application Ser. No. 899,813, filed Apr. 25, 1978, now U.S. Pat. No. 4,229,025 issued Oct. 21, 1980. The teachings of this patent are incorporated hereinto by reference.

Stab type couplings have been known in the art for a considerable period of time. Generally, such couplings are relatively easy to install and merely require severing the end of a pipe or tube at a right angle and then chamfering the tube end to facilitate ease of insertion into a coupling body. One type of stab coupling which is often used is comprised of a pair of coupling bodies joined together in a fluid tight relationship so as to accommodate coupling of adjacent end portions of a pair of pipes or tubes. While such coupling constructions perform a valuable function, some undesirable characteristics are present in certain applications and/or installations. These undesirable characteristics can, however, also become apparent in other types of coupling configurations and applications.

More particularly, in joining adjacent end portions of a pair of pipes or tubes, it is often desired to affix one end of a double ended coupling assembly to one of the pipes and to then install the second pipe to the other end of the coupling assembly at a later point in time. This is often the case where, for example, a natural gas supply line is installed underground to extend from a gas main to at least the general site of a residential or commercial building under construction or contemplated for construction. In that situation, one end of the coupling assembly is installed at the terminal end portion of the underground supply line. A terminal end portion of a second pipe or line is then installed into the coupling other end at some later date and this second line typically extends to a gas meter or the like which has been placed or installed subsequent to installation of the original supply line. Quite often, the coupling is buried beneath ground level or otherwise exposed to the elements after installation onto the supply line. In that case, the end of the coupling assembly which has not yet been joined with the second or associated pipe can be damaged. Such damage, in turn, affects or compromises the integrity of the final coupled joint.

Due to the foregoing problems, it has been considered desirable to provide an improvement for stab type coupling arrangements which would protect the interior of the coupling bodies until such time that they are to be placed into use as by receiving associated pipes or tubes. This protection should be cost effective and allow easy removal when and as desired. The subject invention meets these needs in a simple and reliable manner.

BRIEF DESCRIPTION OF THE INVENTION

Generally, the present invention provides an improvement for a stab type coupling wherein means are included for closing a pipe or tube end receiving recess therein. The closing means is readily removable from the coupling when and as desired to accommodate coupling use.

In accordance with the preferred arrangement, the invention is particularly suited as an improvement for a stab type coupling of the type including a coupling body having a first end area and an internal recess adapted to receive the end portion of a smooth walled non-metallic pipe. An elongated hollow insert is disposed within the recess of the coupling body and about which the pipe end portion is adapted to be received. At least a pipe gripping member is disposed within the recess in a radially spaced surrounding relationship with a portion of the insert so as to retainingly engage a pipe end portion inserted axially therepast. The improvement comprises means associated with the body first end area for closing the recess and thereby protecting the interior of the coupling. The closing means includes means for accommodating selective removal thereof from the body to expose the recess prior to receipt of a pipe end portion thereinto.

According to a more limited aspect of the invention, the closing means is integral with the body and includes a side wall extending axially outward of the body at the first end area with an outer end wall disposed generally transverse of the side wall. The accommodating means may comprise any convenient arrangement for allowing separation of the closing means from the coupling body such as a frangible zone, a designated cutting area and the like.

According to a similar limited aspect of the invention, the closing means comprises a separate end cap secured to the coupling body at generally the first end area. This end cap is selectively removable from the body when it is desired to place the coupling into use for receiving a pipe end portion. This separate closing means may be affixed by convenient means in an abutting relationship with the body first end area or may be releasably mounted in a manner permitting selective end cap installation and removal.

In accordance with a still further aspect of the present invention, the closing means is incorporated onto one end of a double ended stab type coupling which is employed for interconnecting the adjacent end portions of first and second smooth walled non-metallic pipes. This then allows the double ended coupling to be installed on one of the pipes in a manner such that the closing means will protect the coupling interior until such time that it is removed to facilitate installation of the other pipe. This feature is particularly advantageous when it is desired to install or lay one portion of a fluid supply line at one point in time and install or lay the remainder of a fluid supply line at a later point in time.

The principal object of the present invention is the provision of an improved stab type coupling which facilitates protection for the coupling body interior until such time that a pipe or tube is to be inserted thereinto.

Another object resides in the provision of such an improvement which is simple, reliable and readily installed in the field.

Still another object of the invention resides in an improved stab type coupling which is versatile and applicable to a wide range of different stab coupling designs.

Other objects and advantages for the invention will become apparent to those skilled in the art upon a reading and understanding of the following specification.

BRIEF DESCRIPTION OF THE DRAWINGS

The invention may take physical form in certain parts and arrangements of parts, preferred and alternative embodiments of which will be described in this specification and illustrated in the accompanying drawings which form a part hereof and wherein.

DETAILED DESCRIPTION OF PREFERRED AND ALTERNATIVE EMBODIMENTS

Figure 1:
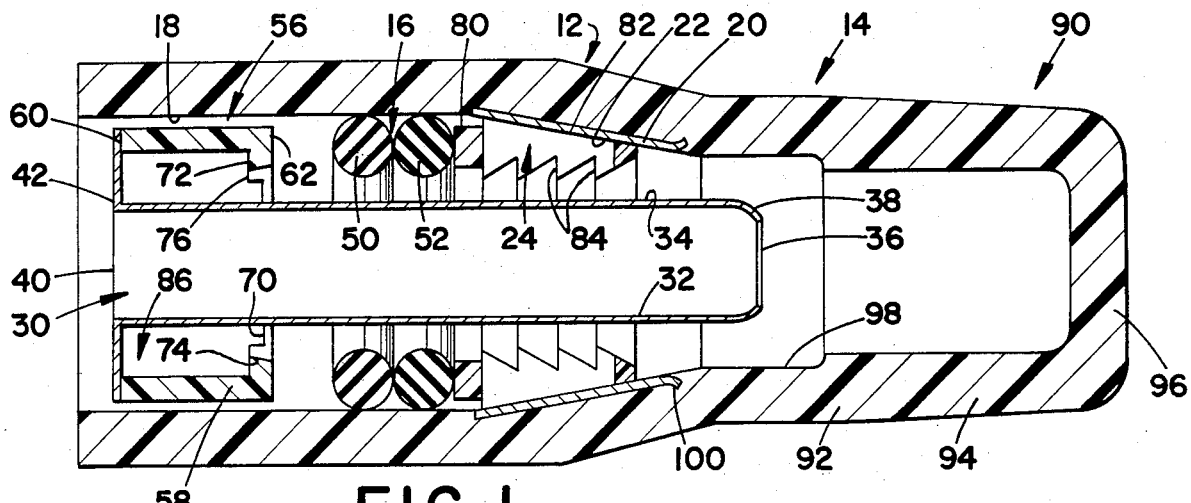
FIG. 1 is a longitudinal cross-sectional view of a preferred coupling construction which incorporates the subject improvement thereinto.

Referring now to the drawings wherein the showings are for purposes of illustrating the preferred and alternative arrangements of the invention and not for purposes of limiting same, FIG. 1 shows one general type of stab type coupling construction having the subject invention incorporated thereinto. This general type of coupling construction is shown and described in commonly assigned U.S. patent application Ser. No. 899,813, filed Apr. 25, 1978, now U.S. Pat. No. 4,229,025 issued Oct. 21, 1980, the teachings of which are incorporated hereinto by reference. It should be appreciated, however, that the coupling may take several different forms and that the structure of FIG. 1 depicts only that portion of the coupling which is significant or pertinent to the present invention.

More particularly and with continued reference to FIG. 1, the coupling includes a non-metallic coupling body 12 having a first end area 14 and an internal recess 16 which is adapted to receive the end portion of a smooth walled non-metallic pipe or tube in a manner described in U.S. Pat. No. 4,229,025. Coupling body 12 defines a generally cylindrical internal surface 18. A generally frustoconical metallic back-up ring 20 is molded into coupling body 12 and defines a generally frustoconical internal surface 22 adapted to cooperate with a retaining collar 24. In the preferred embodiment, coupling body 12 is injection molded from polyethylene or other suitable plastic. Back-up ring 20 is fabricated from type 316 stainless steel and is insert molded into body 12.

Disposed within the recess of body 12 and approximately concentric with the axis thereof is a steel reinforcing stiffener or hollow insert 30. A generally cylindrical internal passage 32 is defined within the stiffener for purposes of permitting fluid passage therethrough. The external surface 34 of the stiffener or insert is dimensioned for receipt within the interior of the end portion of an associated tube. External surface 34 may either be adapted for a close sealing relationship with the internal surface of the tube or, alternately, may be adapted for a loose fitting relationship therein. First or outer end 36 of stiffener 30 includes a chamfer 38 to facilitate entry of the stiffener into the tube as the tube is thrust into the coupling body.

At the second or inner end 40 of insert 30 there is provided a generally radially outward extending flange 42. This flange is dimensioned so that it is closely slidably received within coupling body cylindrical surface 18. Surface 18 cooperates with flange 42 to center, align and maintain stiffener 30 approximately concentric with the axis of coupling body 12.

Sealing between the tube and the coupling body is provided by means of "O" ring seals 50,52 or other suitable seal or gasket means. As will be noted from FIG. 1, these seals are positioned along interior coupling body cylindrical surface 18. The relationship of the "O" ring seals to an associated tube and the coupling body is such that when the tube is inserted into the body, the seals experience a slight compression so that sealing is achieved at the external surface of the tube and at cylindrical surface 18.

A generally annular spacer ring generally designated 56 is disposed essentially concentric with the axis of coupling body 12 adjacent flange 42. In the preferred embodiment here under discussion, this spacer ring is fabricated from polyethylene material and includes a cylindrical portion 58 having an inside diameter greater than the outside diameter of the pipe which is to be inserted into the coupling body. The forward end face 60 of the spacer ring is adapted to engage insert flange 42 and the opposite or rear end face 62 is adapted to be engaged by "O" ring seal 50. A radially inward extending rim or shoulder 70 is disposed at rear end face 62 and has a diameter slightly greater than the outside diameter of the associated tube. A plurality of embossed areas extend a short distance axially inward of rim or shoulder 70 with one such embossed area being designated 72 in FIG. 1. Each of these areas includes an innermost or bottom surface 74 which tapers radially inward from rim 70 to an axial inner edge 76 so as to define a ramp-like tube engaging tooth.

The relative diametrical relationships defined at inner edges 76 of the plural embossed areas are at least slightly less than the outside diameter of a tube to be associated therewith. Tapered bottom surfaces 74 allow the tube to pass therethrough but any attempts at tube withdrawal cause edges 76 to more securely engage the tube and thereby resist such withdrawal. Indeed, attempted withdrawal of the tube from the coupling will cause seal rings 50,52 and collet 24 to move as a unit to the right of FIG. 1 to enhance and supplement tube gripping by spacer ring 56 and the collet. Spacer ring 56 functions to both position "O" ring seals 50,52 in the manner shown in FIG. 1 and to provide support for flange 42 of insert 30 prior to entry of a tube into the coupling body.

Positioned on the outboard side of "O" ring seal 52 is a thrust washer 80. This washer functions to aid in positioning the "O" ring seals and to separate the seals from retaining collet 24. The washer also prevents movement of seal 52 into the recesses of the collet as well as any movement of the seal into the area of the frustoconical surface 22. Seal 52 is thus captured or fixed in the position generally shown in FIG. 1 so as to be in contact with coupling body internal cylindrical surface 18.

Collet 24 is positioned between thrust washer 80 and coupling body first end area 14. The collet is provided with a tapered external surface 82 which converges in the direction of first end area 14. Also, the collet is generally complimentary to frustoconical surface 22 defined by back-up ring 20 to bear against surface 22 during such time as a pull-out force is exerted on an associated tube. The interior of collet 24 is defined by a toothed surface generally designated 84 including inclined ramp surfaces which diverge in the direction of coupling body first end area 14. As a result of the dimensional and structural characteristics of teeth 84, any attempt at withdrawal of an associated tube from the coupling body will cause the teeth to bite into the tube external susrface. It should be appreciated that various other structural arrangements for the teeth may also be advantageously employed.

As described in commonly assigned U.S. Pat. No. 4,229,025, collet 24 is provided with a plurality of generally longitudinally extending recesses. These recesses are staggered such that alternate ones open toward one end of the collet while corresponding alternate ones open toward the collet other end. These recesses permit contraction of the collet at such time as a pull-out force is exerted on the associated tube and the collet is brought into abutting engagement with coupling body back-up ring 20.

All the elements of the overall coupling construction with the exception of back-up ring 20 and insert 30 are fabricated from non-metallic materials. In the preferred construction, the back-up ring is fabricated from stainless steel which renders it essentially impervious to corrosion. The insert 30 may be fabricated from steel or stainless steel. As a consequence, the coupling construction is non-corrosive in nature and suitable for use with plastic pipe. It should be appreciated, however, that alternate materials for the several coupling components may be selected including metals and other plastics. Similarly, and while the coupling construction has been described in connection with use for plastic pipe or tubes, it should be appreciated that metallic tubes or pipes may be used as well.

Couplings of the type hereinabove described are oftentimes used in connection with natural gas supply lines for residential and commercial facilities. In some cases, these supply lines are laid beneath ground level at the time a new road or gas main is installed and prior to such time that the building is under construction or otherwise prepared to receive natural gas. In that type of situation, the supply line will typically run from the main to some point adjacent the building site with the terminal end thereof being marked or otherwise locatable to accommodate connection to the end of another pipe or line which will supply the building.

To that end, it is desirable to provide a so-called double ended coupling arrangement with one end received on the terminal end portion of the supply line extending from the main and the other end adapted to receive the second line at some later point in time which extends to the building itself. In such installations, dirt, water and the like may enter the interior of the coupling assembly from the open end thereof and severely damage the effectiveness of the coupling when it is later required for use. It has, therefore, been desired to develop a coupling arrangement which is normally closed so as to protect the coupling interior but which may be selectively opened for accommodating coupling use as by receiving the end portion of a tube or pipe.

The coupling arrangement shown in FIG. 1 includes such a structure which will be described in detail hereinafter. More particularly, body 12 adjacent first end area 14 thereof includes a closing means defined by an end or protective cap generally designated 90 as an integral part thereof. This cap-like portion includes a generally cylindrical side wall portion 92 at the zone of first end area 14 and a tapering side wall portion 94 which tapers inwardly toward an end wall 96. This end wall is disposed generally transverse of the coupling body longitudinal axis. The inside diameter of side wall portion 92 is dimensioned such that it will define a generally cylindrical internal surface or passage 98 adapted to closely surround the external surface of the tube when it is inserted into the coupling body. As will be noted, the outermost end of metallic back-up ring 20 is flared slightly as at 100 into the side wall of body 12 so as to prevent any damaging interference with the pipe or tube as it is inserted therepast into the coupling.

Figures 2, 3:
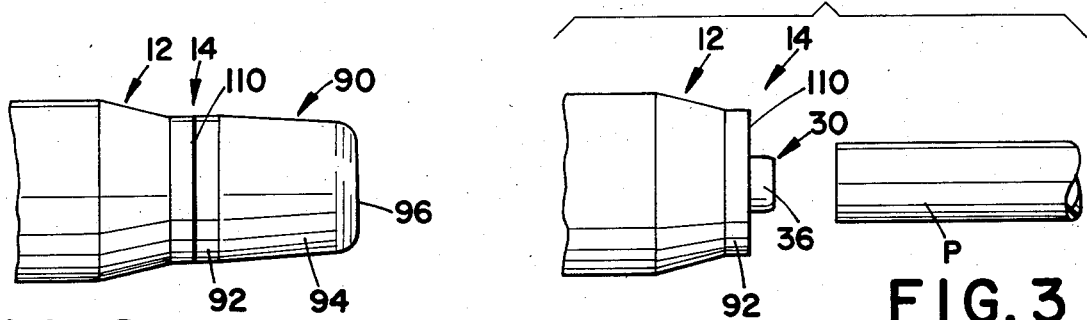
FIG. 2 is a partial side elevational view of the coupling body of FIG. 1 having a closing means integrally formed therewith.
FIG. 3 is a view similar to FIG. 2 but with the closing means removed in anticipation of installing the end portion of a pipe or tube to the coupling.

FIGS. 2 and 3 show partial side elevational views of the coupling of FIG. 1 for purposes of describing use of the subject structural improvement. Cylindrical side wall portion 92 of closing means or cap 90 is adapted to be cut or severed circumferentially therearound at some axial location therealong in order to separate the closing means from the coupling body. The area or zone of such cutting is designated a cutting line 110 in FIG. 2 and may, if desired, be identified directly on side wall portion 92 as by means of painting, scoring or other convenient indicia so that it may be readily identified in the field.

FIG. 3 shows coupling body 12 wherein the closing means has been removed therefrom at separation zone 110 to thereby open the coupling internal recess at first end area 14. As shown, outer end 36 of elongated hollow insert 30 extends slightly axially outward of the recess at first end area 14. The terminal end portion of a smooth walled non-metallic pipe P may then be inserted into coupling body 12 for retention therein in the manner described in commonly assigned U.S. Pat. No. 4,299,025. Insert 30 is received in the interior passageway of pipe P and the external surface of the pipe is engaged by axial inner edge 76 of spacer ring 56 (FIG. 1) and by toothed surfaces 84 of collet 24 (FIG. 1).

As previously noted, separation zone 110 may be located at any axial position along cylindrical wall portion 92 and extends circumferentially therearound. The internal surface of this cylindrical wall portion defines a cylindrical passage 98 adapted to closely surround the external surface of pipe or tube P when it is inserted into the coupling body. Although zone 110 may be formed at any axial location along side wall portion 92, use of specific locating indicia may be desirable for the benefit of those persons utilizing the coupling in the field.

As thus far described, separation of the closing means or cap 90 from coupling body 12 is effected by cutting utilizing, for example, a saw or the like. However, if it is desired to permit such removal without the necessity for using separate tools, it is entirely possible and within the scope of the subject invention to define zone 110 by other means as by, for example, a frangible area. This then allows a snapping type separation between the closing means and coupling body. In that case, the frangible area may be conveniently defined by prestressed or weakened areas circumferentially of closing means or cap 90. It is also desirable that the closing means be in a fluid tight relationship with the coupling body. The reasons for this will become more readily apparent hereinafter in the discussion pertaining to FIG. 6.

Figures 4, 5:
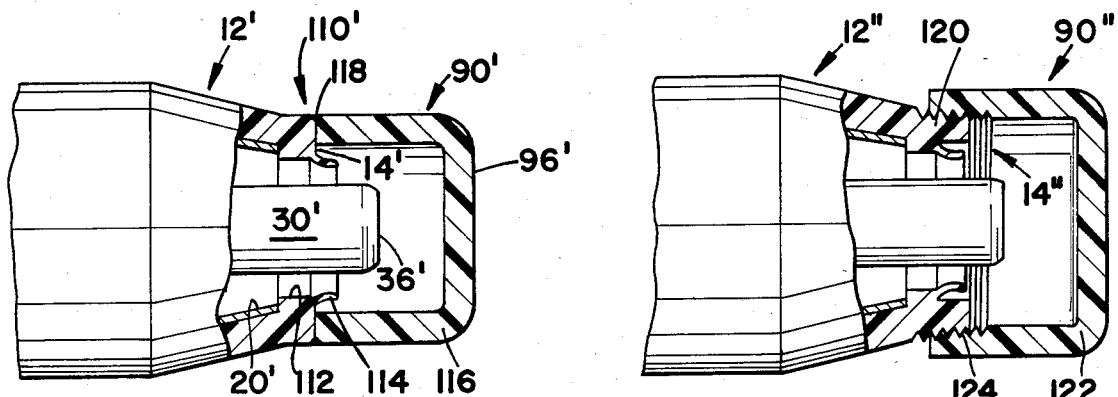
FIG. 4 is a partial side elevational view in partial cross-section showing one alternative arrangement for practicing the subject invention.
FIG. 5 is a partial side elevational view in partial cross-section showing another alternative arrangement for practicing the invention; and, FIG. 6 is a double ended stab type coupling which incorporates the subject invention thereinto.

While the closing means 90 shown in FIGS. 1, 2 and 3 is integrally formed in one piece with coupling body 12, FIGS. 4 and 5 show two alternative arrangements wherein the closing means and coupling body are formed separately. First, and with regard to FIG. 4, like components are identified by like numerals with a primed (') suffix and new components are identified by new numerals. In that FIGURE, coupling body 12' terminates in a first end area 14' with outer end 36' of hollow insert 30' extending slightly axially outward thereof.

A generally cylindrical internal surface or passage 112 is provided adjacent first end area 14'. This surface of passage is adapted to closely surround the external surface of a pipe or tube when it is inserted into the coupling body. Molded integrally with the coupling body is a generally axially outward extending flexible flange or lip 114 which defines a dirt and moisture cover. The function of this cover is to prohibit altogether or at least retard entry of dirt and moisture into the interior of the coupling body 12'. As described in detail in commonly assigned U.S. Pat. No. 4,229,025, the relationship between lip 114 and an associated tube is such that the lip will sealingly engage the tube external surface through a slight interference fit.

A cup-shaped closing means or cap 90' is constructed from the same or a compatible material as coupling body 12' and includes a generally cylindrical side wall 116 terminating in an outer end wall 96'. The inner end face 118 of side wall 116 is adapted to abut coupling body first end area 14'. Convenient means compatible with the materials from which coupling body 12' and closing means 90' are constructed are utilized to fixedly secure the closing means to the coupling body in an abutting relationship as shown in FIG. 4. Such means may include adhesives and various types of welding or fusing techniques. The area of the joint between first end area 14' and closing means end face 118 thus defines separation zone 110'. When placing the coupling into use, the closing means is removed from association with the coupling body by convenient means. Also, the end cap or closing means is desirably affixed to the coupling body at zone 110' in a fluid tight relationship for reasons which will be described.

FIG. 5 shows an arrangement wherein the closing means or end cap is releasably installable and removable from operative association with the coupling body. In this arrangement, like components are identified by like numerals with a double primed (") suffix and new components are identified by new numerals and overall, construction of the coupling is substantially the same as that shown and described with reference to FIG. 4.

Here, however, coupling body 12" includes a short, externally threaded extension 120 adjacent coupling body first end area 14". Closing means 90" is again generally cup-shaped with the generally cylindrical side wall 122 thereof being internally threaded as at 124 to accommodate threaded installation and removal of the closing means on the coupling body in the manner shown. The threaded arrangement itself may comprise any convenient construction, although it is preferred that when closing means 90" is installed on coupling body 12", they will be joined in a fluid tight relationship.

In addition to the two specific alternative embodiments disclosed with reference to FIGS. 4 and 5, it will be appreciated by those skilled in the art that other suitable constructions may be advantageously employed for interconnecting a closing means or end cap to the coupling body. Among these are snap-on arrangements, bayonette type fittings and the like. Such modifications are not in any way deemed to depart from the overall intent or scope of the present invention.

Figure 6:
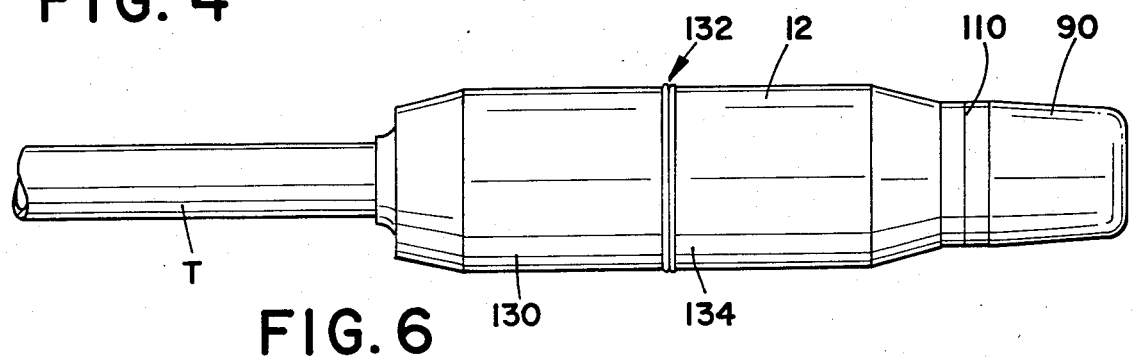

FIG. 6 shows a double ended type of coupling construction for which the subject invention is particularly suited for use. In this arrangement, one coupling body generally designated 130 and constructed in the manner described in detail in commonly assigned U.S. Pat. No. 4,229,025 is joined in a fluid tight relationship at its innermost end to the innermost end of coupling body 12 which takes the form of the construction described in detail hereinabove with reference to FIGS. 1-3. The interconnection between coupling bodies 130,12 is designated by area 132 and may comprise any suitable means which is compatible with the construction of the coupling bodies. Body 130 receives the end portion of a pipe or tube T which extends from the source of some fluid such as natural gas or the like which is to ultimately be passed through the coupling and then on to a point of use by means of a second pipe or tube. Pipe or tube T, along with the coupling assembly which is comprised of bodies 130,12, may be buried beneath ground level or otherwise disposed until such time that it is desired or possible to connect the second pipe or tube to coupling body 12 and thereby establish fluid communication between the pipes. This particular situation will occur when, for example, a fluid supply line is laid from a supply main to a residential or commercial building under construction or contemplated for construction at some future date. Because of the fluid tight relationship at joint 132 between coupling bodies 130,12 and the fluid tight relationship between closing means 90 and coupling body 12, fluid passed through tube T into the coupling assembly may not thereafter pass outwardly therefrom. This is particularly important in the case where natural gas or the like is involved. When it is desired to install a pipe or tube into operative association with coupling 12, it is merely necessary to remove closing means 90 from coupling body 12 at zone 110 as hereinabove previously described with reference to FIGS. 2 and 3.

It should be readily appreciated that the closing means described hereinabove is not limited to the specific application described with reference to FIG. 6. Indeed, coupling body 12 may be utilized in and of itself for accomplishing the same desirable end results. For example, and with reference to FIG. 6, innermost end area or zone 134 of coupling body 12 could be provided with external male threads defining a male connector end or it could be provided with female threads defining a female connector. Alternately, the coupling could be used as a reducing fitting, an L-fitting, a T-fitting, a transition fitting or any other type of fitting known to the industry. Therefore, it should be appreciated that the overall concepts of the present invention are readily adapted to use with any number of types and styles of stab type fittings as well as the different applications therefor.

The invention has been described with reference to preferred and alternative embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. A tubing end closure which is adapted to be converted into a stab-type coupling comprising:
   a. an integral, plastic coupling body including:
      i. a first body portion having an interior surface which in part defines an insert receiving region therein,
      ii. a second body portion having a frustoconical interior camming surface which in part defines the insert receiving region therein, the second body portion being integrally formed within the first body portion,
      iii. a third body portion having an interior cylindrical, tubing engaging surface which in part defines the insert receiving region therein and which is dimensioned for frictionally engaging an exterior surface of a received tubing length received therein, the third body portion being integrally formed with the second body portion,
      iv. a fourth body portion which in part defines the insert receiving region therein, the fourth body portion being integrally formed with the third body portion,
      v. a fifth body portion including a closed end wall extending generally transverse to the first, second, third, and fourth body portions to define an end surface to the insert receiving region, the fifth body portion being integrally formed with the fourth body portion such that the insert receiving region is sealed from the atmosphere and blocked from receiving tubing therein by the end wall, and
      vi. a cutting indicia circumscribing the coupling body adjacent the fourth body portion to denote a cutting line along which the fifth body portion can be cut off safely to remove the end wall and expose at least the third body portion tubing engaging surface to the atmosphere, whereby after the fifth body portion is severed the end closure is converted to the stab-type coupling and adapted to receive an end of a length of tubing therein;
   b. an elongated hollow insert having a flanged portion disposed within the first body portion in the insert receiving region, an elongated longitudinal portion disposed within at least the first, second, and third body portions in the insert receiving region, the insert elongated portion extending from the flanged portion within the first body portion to an open outer end disposed within one of the third and fourth body portions, the insert elongated portion open outer end being disposed adjacent the fifth body portion and being dimensioned for tight frictional engagement within a received tubing length interior surface such that the fifth body portion both closes the fourth body portion to seal against the receipt of dirt therein and protects the insert open outer end;
   c. a gripping collet means slidably received within the second body portion in the insert receiving region and surrounding the insert elongated portion, the gripping collet means being dimensioned for frictionally engaging a received tubing length exterior surface; and,
   d. a seal disposed between the insert flanged portion and the gripping collet means such that axial movement of the insert is transmitted by the seal to the collet means camming the collet means against the conical surface.

2. A stab-type coupling for couplingly receiving a pipe end portion including:
   a one piece, integral body and end cap of synthetic plastic material, the body defining a hollow receiving region therein and a first end area cylindrical pipe engaging inner surface dimensioned for receiving the pipe end portion;
   an elongated hollow insert separate from said body, disposed within said receiving region, and having an open outer end portion located adjacent said first end area cylindrical pipe engaging inner surface, said open outer end portion of said insert and at least a longitudinal portion of said insert being receivable within the pipe end portion when such pipe is inserted into said body end area inner surface for establishing fluid flow communication between said insert and the pipe;
   gripping means disposed within said receiving region surrounding a portion of said insert in a radially spaced relationship with said body and insert and dimensioned for externally gripping the pipe end portion;
   the end cap being unitary with said body first end area, said cap including an annular sidewall unitary with and extending axially outward from said body first end area and radially spaced from said insert and a unitary end wall disposed generally transverse of said cap sidewall axially spaced from said insert, said cap sidewall and end wall defining a cup-shaped cap recess in which said insert outer end portion is receivable, such that the cap performs dual functions of (i) closing said receiving region to seal the interior of said coupling from receiving ambient dirt therein and from discharging fluids therefrom and (ii) covering said insert outer end portion to protect said insert outer end portion; and,
   a cutting line integrally formed peripherally around the cap sidewall axially outward from the insert outer end portion to mark a location at which the cap end wall can be cut off without damaging the insert outer end portion, whereby the coupling may be buried in the ground for an extended duration before the cap end wall is cut off and the pipe end portion is couplingly received therein without dirt entering the coupling, without gas or fluids conveyed thereto leaking, and without damage to the insert.

* * * * *